United States Patent
Blankers

[19]

[11] Patent Number: 6,011,361
[45] Date of Patent: *Jan. 4, 2000

[54] BUCK CONVERTER SWITCHING SCHEME

[75] Inventor: Hendrik J. Blankers, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/726,711

[22] Filed: Oct. 7, 1996

[30]  Foreign Application Priority Data

Oct. 9, 1995  [EP]  European Pat. Off. .............. 95202700

[51] Int. Cl.[7] .................................................. H05B 41/36
[52] U.S. Cl. ..................... 315/307; 315/209 R; 315/224; 315/247; 315/DIG. 5
[58] Field of Search ..................................... 315/307, 224, 315/247, DIG. 7, 209 R, DIG. 5; 323/205, 207, 209, 206, 282, 284, 285, 290

[56]  References Cited

U.S. PATENT DOCUMENTS

| 4,412,154 | 10/1983 | Klein | 315/224 |
|---|---|---|---|
| 5,068,572 | 11/1991 | Blankers | 315/209 R |
| 5,170,333 | 12/1992 | Niwayama | 363/21 |
| 5,369,340 | 11/1994 | Leyton | 315/307 |

*Primary Examiner*—Arnold Kinkead
*Attorney, Agent, or Firm*—Bernard Franzblau

[57]  ABSTRACT

An arrangement for igniting and operating a high-pressure discharge lamp provided with a Buck converter for supplying the lamp through periodic switching of a switching device which is held alternately in a conducting state for a period $t_{on}$ and in a non-conducting state for a period $t_{off}$. The arrangement further includes circuitry which produces fixed minimum and maximum time limits for the time duration $t_{off}$.

21 Claims, 2 Drawing Sheets

BUCK CONVERTER SWITCHING SCHEME

BACKGROUND OF THE INVENTION

This invention relates to a circuit arrangement for igniting and operating a high-pressure discharge lamp, provided with switching means, inductive means, and rectifying means together forming a Buck converter connected to input terminals for connection to a supply source and output terminals for connection of the means comprising the lamp so as to supply the lamp with a current through periodic switching of the switching means by means of a control signal alternately into a conducting state during a period $t_{on}$ and into a non-conducting state during a period $t_{off}$, the Buck converter operating in a self-oscillatory mode during stable lamp operation, and a control circuit for generating the control signal, comprising a portion for generating a switch-on signal and a portion for generating a switch-off signal.

A circuit arrangement of the kind mentioned in the opening paragraph is known from European Patent Application EP-A-0 401 931 whose U.S. equivalent is U.S. Pat. No. 5,068,572. The known circuit arrangement is particularly suitable for igniting and operating a high-pressure discharge lamp which forms part of a projection TV installation.

The type of switch mode power supply called Buck converter here is also known under other designations such as downconverter, step-down converter, inductor-coupled step-down converter, direct-down converter.

Although in general the input terminals and output terminals in a Buck converter are in direct electrical connection with one another, it is equally well possible for the circuit to be provided with an electrical separation between input and output terminals, for example, in the form of a transformer.

The means comprising the lamp comprise a commutator circuit in many practical cases with the object of passing a current of alternating polarity through the lamp during lamp operation. The means comprising the lamp in general also comprise an igniter circuit for generating a voltage pulse for lamp ignition. Both the commutator circuit and the igniter circuit usually form part of the circuit arrangement according to the invention. The commutator means can be left out in the case of a lamp operating on a DC voltage.

In the known circuit arrangement, the Buck converter operates in a self-oscillatory mode which is characterized by the fact that the generation of the control signal for switching the switching means into the conducting state, i.e. the switch-on signal, is initiated the moment that the current through the inductive means has become zero, and switching takes place immediately after that.

It is possible with the known circuit arrangement to supply a substantially constant power to the connected lamp over a comparatively wide current and voltage range, so that the lamp generates a luminous flux which is constant to a high degree. Especially in the V-I range, where the lamp operates in a stable manner, the self-oscillatory mode is characterized by low switching losses in the periodic switching of the switching means. Preferably, the downconverter is dimensioned such that the frequency of the self-oscillatory mode lies above the limit of human hearing during stable lamp operation. This implies that the dimensions of the self-induction means must remain comparatively small. Switching from the conducting to the non-conducting state takes place in the known circuit arrangement when a signal proportional to the current through the inductive means becomes equal to a separately set control signal. A control of the power supplied to the lamp is possible through a control of the current at the output terminals of the circuit arrangement, for example in dependence on the voltage across the output terminals.

Although a controlled current source of comparatively simple construction is realized with the known circuit arrangement, where the power dissipated in a load (the lamp) is also controllable, the known circuit arrangement does have a number of disadvantages.

Both the period $t_{on}$ and the period $t_{off}$ are variable in the known circuit arrangement within a range which is determined only on the one hand by the maximum current through the inductive means and on the other hand by the dimensions of the inductive means and the value of the voltage at the input and output terminals (input and output voltage). Although this leads to a reliable and optimum-efficiency operation of the circuit arrangement under conditions of stable lamp operation, it leads to considerable power losses under abnormal operating conditions, which may even lead to the switching means becoming defective. There is also a risk that the switching frequency of the switching means will come to lie within the audible range.

SUMMARY OF THE INVENTION

The invention has for its object to provide a measure by which the above disadvantages can be eliminated or at least substantially counteracted.

According to the invention, a circuit arrangement of the kind mentioned in the opening paragraph is for this purpose characterized in that the circuit arrangement comprises means by which a fixed limitation of the period $t_{off}$ is defined.

It is surprisingly found that the disadvantages of the known circuit arrangement can be counteracted exclusively through a limitation of the period $t_{off}$. On the one hand, the imposition of the fixed limitation of the period $t_{off}$ in the form of a maximum period $t_{max}$ results in the switching frequency remaining outside the audible range. On the other hand, the fixed limitation of the period $t_{off}$ to a minimum period $t_{min}$ was found to be highly suitable for limiting switching losses to acceptable proportions.

With the self-oscillatory mode of operation of the circuit arrangement as a starting point, the fixed limitation of the period $t_{off}$ can be realized by means of a suitable change in the dimensions of the inductive means.

In an advantageous embodiment, the generation of the switch-on signal takes place through a coupling of the control signal, while the switching means are in the non-conducting state, to the portion of the control circuit which generates the switch-on signal. The coupling is for this purpose provided with a delay circuit. A first delay circuit serves to realize $t_{min}$ and has a comparatively short delay time. A second delay circuit serves to realize $t_{max}$ and has a comparatively long delay time. The construction may be comparatively simple owing to the use of the control signal for generating the switch-on signal because the means for limiting the period $t_{off}$ form part exclusively of the control circuit.

It is true that this realization of $t_{min}$ and $t_{max}$ will lead to an operation of the circuit arrangement in a forced oscillatory mode, in particular a discontinuous mode and a continuous mode, respectively. This may be very favorably applied, however, to the ignition and operation of a high-pressure discharge lamp, in particular when the lamp has not yet ignited and during the run-up of the lamp, the latter being a condition of the lamp in which an arc discharge has developed in the lamp, but the stable operational state has not yet been reached. Major deviations of $t_{off}$ from the value obtaining in stable lamp operation occur especially when the lamp has not yet ignited and during lamp run-up.

The following may serve as an explanation. The concept "forced oscillatory mode" in relation to the Buck converter in the present description and claims is understood to refer to those modes in which switching of the switching means from the non-conducting to the conducting state is not triggered by the fact that the current through the inductive means becomes zero.

Two types of forced oscillatory modes can be distinguished:

continuous mode discontinuous mode.

In the continuous mode, a current flows continuously through the inductive means, so also during switching of the switching means from the non-conducting to the conducting state. When the circuit arrangement operates in the continuous mode, the ripple in the current through the load connected to the output terminals is comparatively small, and the load can be supplied with a comparatively strong current. Since the switching means switch a comparatively strong current from the non-conducting to the conducting state under these circumstances, the switching losses are correspondingly high.

In the discontinuous mode of operation of the circuit arrangement, the current through the inductive means does become zero, but the process of switching of the switching means from the non-conducting state to the conducting state is not triggered thereby. Although it is possible for the current through the inductive means to remain zero in the subsequent time period up to the moment the switching means are made conducting, the construction of practical realizations of the circuit arrangement will often comprise a secondary circuit of which the inductive means form a part and which acts as a tuned circuit in the subsequent period. A suitable choice of the moment at which switching to the conducting state takes place after said subsequent period has elapsed renders it possible to have this switching take place with low switching losses. The ripple in the current through the connected load branch may be comparatively great, and the voltage across the load branch may be comparatively high when the circuit arrangement operates in the discontinuous mode.

The following lamp conditions can be distinguished in the ignition and operation of a high-pressure discharge lamp:

extinguished, non-ignited lamp, breakdown in the lamp followed by a glow discharge, and transition from glow discharge to arc discharge, run-up of the lamp, stable lamp operation.

No electric conduction takes place in the lamp in the extinguished, non-ignited state. The voltage across the lamp is equal to the external supply voltage applied to the lamp.

When a high-voltage pulse, called ignition pulse, is generated across the lamp, breakdown will take place in the lamp so that electric conduction in the form of a glow discharge will arise in the lamp, which in its turn will change into an arc discharge given a sufficient current supply. The voltage across the discharge (the lamp voltage), and accordingly the voltage across the lamp, abruptly drops to a few volts owing to the conduction in the lamp caused by the breakdown.

The run-up of the lamp is the lamp condition in which an arc discharge caused by ignition develops into the condition of stable lamp operation. The voltage gradually rises during the run-up. The run-up is initially accompanied by a strong current through the lamp, which gradually decreases as the arc voltage increases. To prevent an excessive load on the lamp, it is desirable under certain conditions to limit the current value to a maximum and thus control the power supplied to the lamp and have this power rise only slowly.

In the stable operational condition, the lamp has a stable lamp voltage which is in accordance with the power consumed by the lamp and the thermodynamic balance prevailing in the lamp.

In the extinguished, non-ignited condition of the lamp, a comparatively high voltage at the output terminals of the circuit arrangement is favorable for a quick and reliable ignition of the connected lamp. Since the lamp is non-conducting in this condition, the occurrence of a strong current ripple at the output terminals is no great disadvantage. The operation of the circuit arrangement in the discontinuous mode is accordingly very suitable for this lamp condition.

During lamp run-up, it is initially important to supply the lamp with a comparatively strong current with the object of having the lamp reach its stable operational condition quickly and reliably. Operation of the circuit arrangement in the continuous mode is highly suitable for this at least in the initial phase of the run-up. The comparatively high switching losses occurring in the continuous mode do not constitute a major negative factor here because the run-up of the high-pressure discharge lamp is of a limited, comparatively short duration.

The circuit arrangement according to the invention is particularly suitable for use in a projection TV installation. The circuit arrangement may also be advantageously used in a motorcar headlight system. Both applications involve the ignition and operation of a high-pressure discharge lamp of very compact shape which in the stable operational condition is to supply a highly constant luminous flux and has a high ignition voltage. After breakdown, it is of the greatest importance, especially for a motorcar headlight system, that light should be emitted very quickly, and thus that the run-up to the stable operational condition takes place within a short period.

In the projection TV application, a limitation of the maximum current through the inductive means with the circuit arrangement operating in the continuous mode will often be provided with for the purpose of preventing an overload on the lamp.

The coupling comprises an AND gate in the first delay circuit in an advantageous embodiment of the circuit arrangement. The AND gate serves for logic combination of the delayed control signal in the non-conducting state of the switching means and a signal generated in the control circuit portion which generates the switch-on signal. The value of $t_{min}$ is safeguarded in a simple and effective manner through the use of the AND gate. The value of $t_{min}$ corresponds to the delay value of the first delay circuit then.

Similarly, the coupling in the second delay circuit comprises an OR gate for logic combination of the delayed control signal in the non-conducting state of the switching means and a signal generated in the circuit portion which generates the switch-on signal. The value of $t_{max}$ is safeguarded thereby, which value corresponds to the value of the delay of the second delay circuit.

A connection between an output of the AND gate and an input of the OR gate leads to a combination which safeguards both $t_{min}$ and $t_{max}$ in a very simple manner.

BRIEF DESCRIPTION OF THE DRAWING

The above and further aspects of the invention will be explained in more detail below with reference to a drawing, in which.

DETAILED DESCRIPTION OF THE PREFERRED EMBODIMENT

Figure 1:
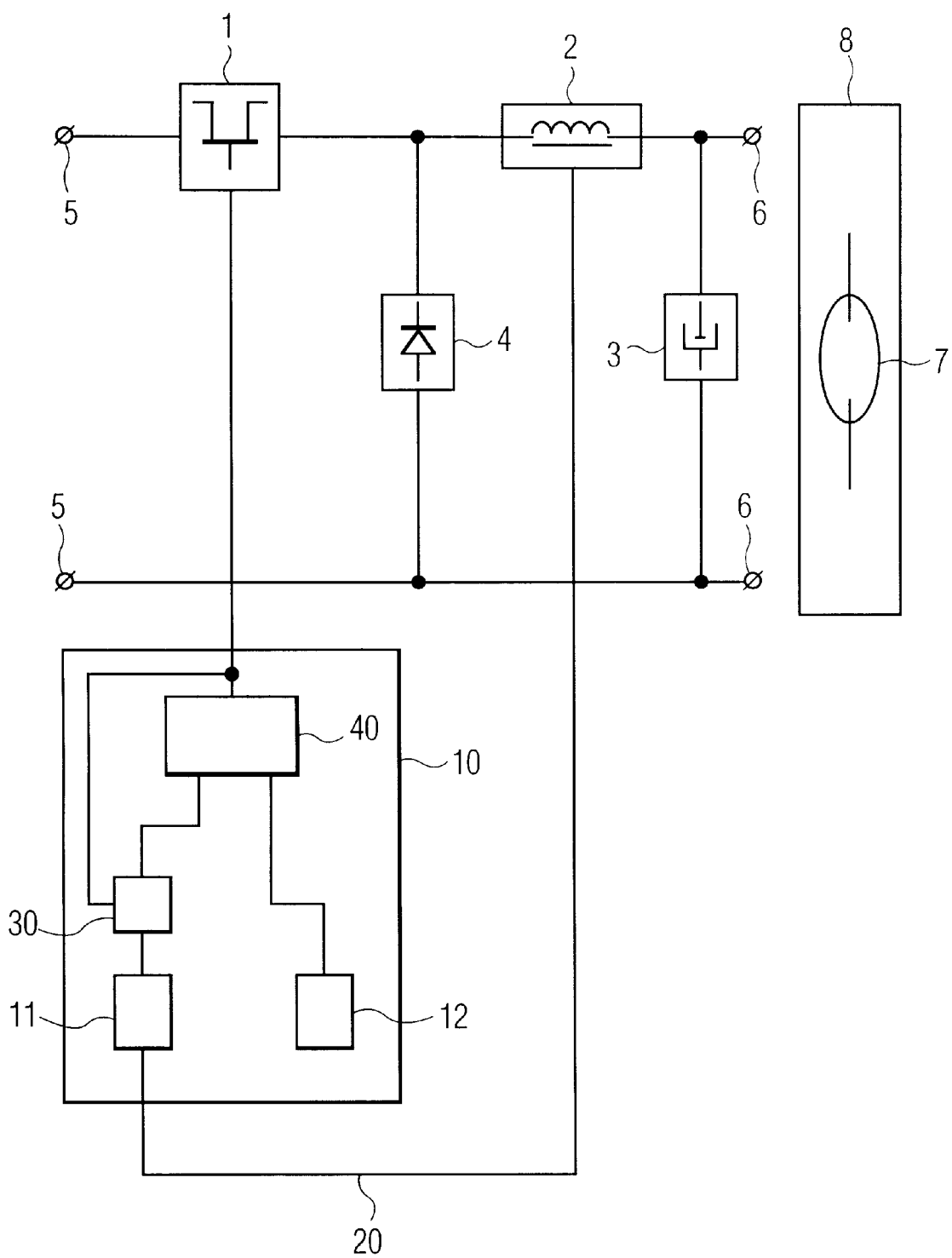
FIG. 1 is a diagram of a circuit arrangement according to the invention.

FIG. 1 shows a circuit arrangement for igniting and operating a high-pressure discharge lamp 7 provided with switching means 1, inductive means 2 and rectifying means 4 together forming a Buck converter. The Buck converter is also provided with capacitive buffer means 3. The Buck converter is connected to input terminals 5 for connection to a supply source and output terminals 6 for connection to the means 8 comprising the lamp 7 so as to supply the lamp with a current. The switching means are periodically switched by means of a control signal, whereby it is alternately held in a conducting state for a time duration $t_{on}$ and in a non-conducting state for a time duration $t_{off}$. The Buck converter operates in a self-oscillatory mode during stable lamp operation.

The circuit arrangement is also provided with a control circuit 10 for generating the control signal, comprising a portion 11 (i.e. switch-on circuitry) for generating a switch-on signal and a portion 12 (i.e. switch-off circuitry) for generating a switch-off signal. Reference numeral 20 denotes a connection for effecting the self-oscillatory mode, the switch-on signal being initiated the moment that the current through the inductive means has become zero.

A coupling of the control signal to the portion of the control circuit for generating the switch-on signal is indicated with 30.

The control signal for keeping the switching means in the conducting state for a period $t_{on}$ and in the non-conducting state for a period $t_{off}$ is formed in a modulator 40 of the control circuit 10 on the basis of the switch-on signal coming from 11 and the switch-off signal coming from 12, respectively.

Figure 2:
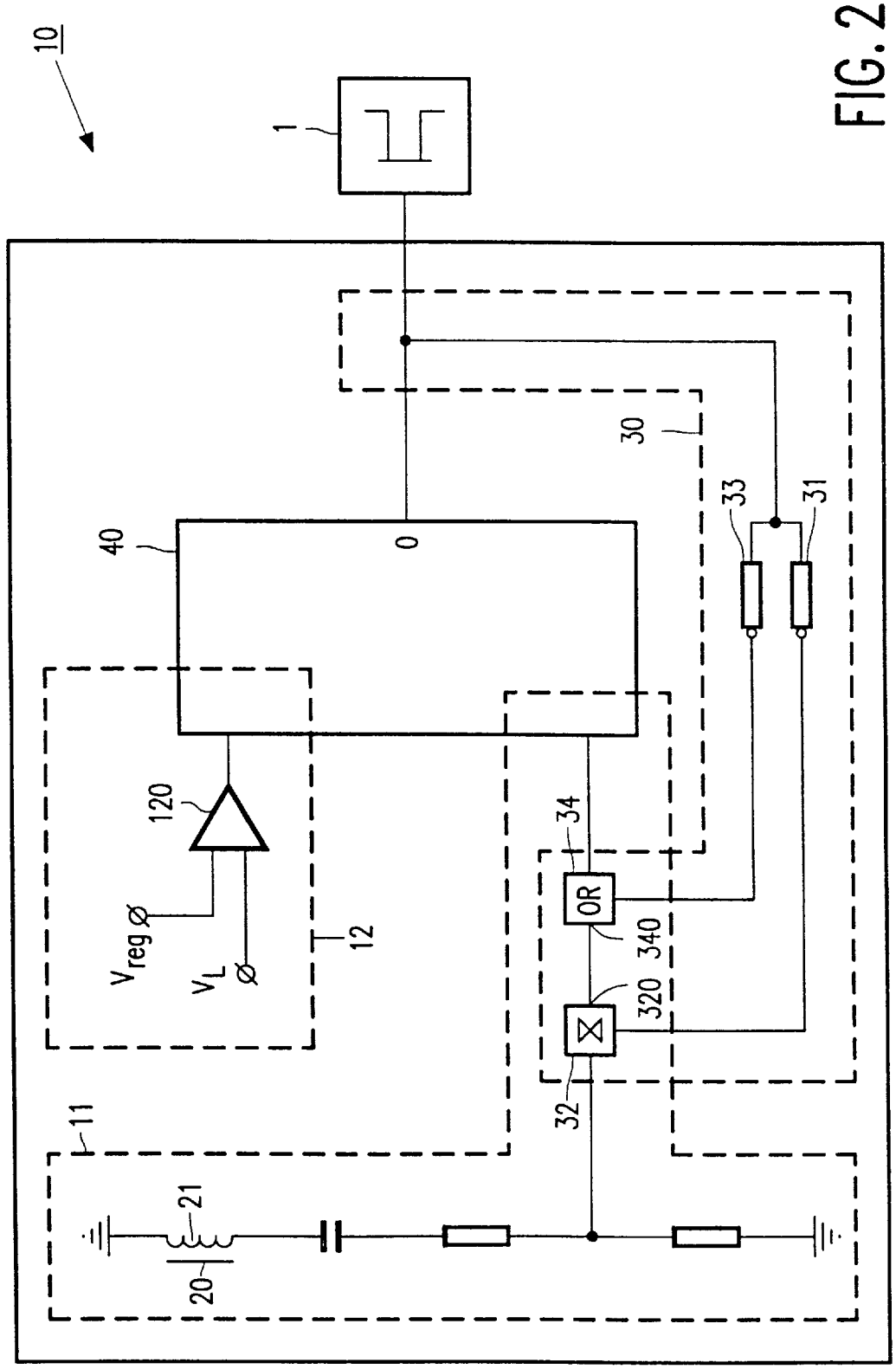
FIG. 2 shows a control circuit of the circuit arrangement of FIG. 1 in more detail.

FIG. 2 shows a practical realization of the control circuit 10 in a more detailed diagram. Components corresponding to those in FIG. 1 have been given the same reference numerals.

The portion of the control circuit for generating the switch-on signal comprises a voltage divider circuit comprising a winding 21. The winding 21 is a secondary winding which forms part of the inductive means 2, the magnetic coupling between the secondary winding and a primary winding forming the connection 20. Only the secondary winding 21 with the magnetic coupling 20 is shown in FIG. 2 for reasons of clarity. The voltage divider circuit generates a signal which is led to modulator 40 via an AND gate 32 and an OR gate 34. An output 320 of AND gate 32 is for this purpose connected to an input 340 of the OR gate 34.

The AND gate 32 forms part of the coupling 30 between the control signal present at output 0 of modulator 40 and the circuit portion 11 for generating the switch-on signal. The coupling comprises a first delay circuit 31 for realizing $t_{min}$, connected to the AND gate 32. The delay circuit in the embodiment shown is provided with an inverter.

In its turn, the OR gate is connected to a second delay circuit 33 provided with an inverter and forming part of the coupling 30. The second delay circuit serves to realize $t_{max}$.

Control circuit portion 12 comprises a comparator 120 for comparing a voltage $V_L$ proportional to the current through the inductive means 2 with a reference voltage $V_{reg}$. By controlling the value of $V_{reg}$, for example, on the basis of the voltage across the output terminals of the circuit arrangement, it is possible to control the power supplied by the circuit arrangement. An output of the comparator is connected to modulator 40. In a practical realization of the circuit arrangement described, the construction and operation of circuit portion 12 as regards the generation of a signal proportional to the value of the current through the inductive means is comparable to a high degree to the circuit portion for generating the switch-off signal known from European Application EP-A-0 401 931.

In a practical realization of the embodiment of the circuit arrangement described, with the circuit arrangement operating in the self-oscillatory mode, the control signal for switching the switching means from the non-conducting to the conducting state takes place in a manner similar to that known from the circuit arrangement of European Application EP-A-0 401 931.

The minimum period of $t_{min}$ achieved by the means 31 in the practical realization described is 5 µs. The maximum duration $t_{max}$ achieved by the means 33 is 36 µs.

The practical realization of the circuit arrangement is suitable for connection to a supply source of 220 V, 50 Hz. The circuit arrangement is for this purpose provided with a portion (not shown and known per se) between the input terminals and the switching means for converting the AC voltage connected to the input terminals to a suitable DC voltage for operating the switching means.

The practical realization of the circuit arrangement described is suitable for operating a type UHP high-pressure metal halide lamp made by Philips Electronics lamp has a power rating of 100 W for a nominal lamp voltage of 85 V and a lamp current of 1.2 A. A type IRF840 MOSFET, made by International Rectifier, serves as the switching means 1. The inductive means 2 are formed by a transformer with a ferrite core, a primary winding of 100 turns and a secondary winding 21 of 30 turns, forming part of the portion of control circuit 11 which generates the switch-on signal and serving as a voltage source for generating the control signal for switching the switching means to the conducting state. The capacitive buffer means have a capacitance value of 0.82 µF. The rectifying means 4 are formed by a type BYV29F500 diode, made by Philips Electronics. The circuit arrangement is then capable of supplying a constant power to the output terminals over a range from 50 to 110 V, with the Buck converter operating in the self-oscillatory mode.

In the extinguished, non-ignited lamp condition, the circuit arrangement operates in the discontinuous mode. The voltage across the output terminals is 160 V. The circuit arrangement is provided with an igniter circuit which generates ignition pulses of 20 kV, whereupon the lamp will ignite.

The voltage across the lamp drops to 15 V, and thus also the voltage across the output terminals, the moment the lamp condition with an arc discharge in the lamp has been reached. The circuit arrangement then abruptly changes from the discontinuous mode to the continuous mode. A current limited to a maximum value of 2 A is then supplied to the lamp. The lamp voltage gradually rises during the run-up of the lamp, and the current through the lamp decreases. This manifests itself in a quicker drop of the current through the inductive means during the non-conducting periods of the switching means.

The operation of the circuit arrangement switches from the continuous mode to the self-oscillatory mode the moment that the current through the inductive means becomes zero within 36 μs with the switching means in the non-conducting state. The circuit arrangement is provided with means for controlling the power supplied to the output terminals to a constant level.

In the practical realization described, this corresponds to a voltage across the lamp and across the output terminals of 50 V. Subsequently, the lamp run-up continues until the lamp voltage has reached the stable level, and thus the state of stable lamp operation. The constant-power control causes the lamp to reach its stable operational state at a nominal lamp voltage of 85 V.

The period during which the switching means are in the non-conducting state is approximately 18 μs when stable lamp operation takes place at the rated lamp power.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

I claim:

1. A circuit arrangement, for igniting and operating a high-pressure discharge lamp, comprising:
   a Buck converter operative in a self-oscillatory mode during stable lamp operation and which includes switching means, inductive means, and rectifying means for supplying the lamp with a current through periodic switching of the switching means into a conducting state in response to a switch-on signal portion of a control signal during a time period $t_{on}$ and into a non-conducing state in response to a switch-off signal portion of the control signal during a time period $t_{off}$;
   a control circuit for supplying the control signal to the switching means, wherein the control circuit comprises means for providing fixed limits for the time period $t_{off}$ wherein generation of the switch-on signal portion occurs after a time delayed response to the generation of the switch-off signal portion.

2. The circuit arrangement as claimed in claim 1, wherein the fixed limits of the time period $t_{off}$ comprises a minimum time period $t_{min}$.

3. The circuit arrangement as claimed in claim 1, wherein the fixed limits of the time period $t_{off}$ comprises a maximum time period $t_{max}$.

4. The circuit arrangement as claimed in claim 2, wherein the control circuit includes switch-on circuitry for controlling generation of the switch-on signal portion, switch-off circuitry for controlling generation of the switch-off signal portion and means for coupling the control signal to the switch-on circuitry when the switching means are in the non-conducting state.

5. The circuit arrangement as claimed in claim 4, wherein said coupling means includes a first delay for defining the minimum time period $t_{min}$.

6. A circuit arrangement for igniting and operating a high-pressure discharge lamp, comprising:
   a Buck converter including switching means, inductive means, and rectifying means for supplying the lamp with a current through periodic switching of the switching means by means of a control signal alternately into a conducting state during a period $t_{on}$ and into a non-conducting state during a period $t_{off}$, the Buck converter operating in a self-oscillatory mode during stable lamp operation, and
   a control circuit for generating the control signal and comprising a portion for generating a switch-on signal, a portion for generating a switch-off signal and coupling means for applying the control signal to the portion for generating the switch-on signal, characterized in that the control circuit further comprises means for fixedly limiting the period $t_{off}$, and wherein the coupling means includes an AND gate.

7. A circuit arrangement for igniting and operating a high-pressure discharge lamp, comprising:
   a Buck converter including switching means, inductive means, and rectifying means for supplying the lamp with a current through periodic switching of the switching means by means of a control signal alternately into a conducting state during a period $t_{on}$ and into a non-conducting state during a period $t_{off}$, the Buck converter operating in a self-oscillatory mode during stable lamp operation, and
   a control circuit for generating the control signal and comprising a portion for generating a switch-on signal, a portion for generating a switch-off signal and coupling means for applying the control signal to the portion for generating the switch-on signal, characterized in that the control circuit further comprises means for fixedly limiting the period $t_{off}$ to one of either a minimum period $t_{min}$ or a maximum period $t_{max}$, and wherein the coupling means includes a first delay circuit associated with $t_{min}$ and a second delay circuit associated with $t_{max}$.

8. A circuit arrangement for igniting and operating a high-pressure discharge lamp, comprising:
   a Buck converter including switching means, inductive means, and rectifying means for supplying the lamp with a current through periodic switching of the switching means by means of a control signal alternately into a conducting state during a period $t_{on}$ and into a non-conducting state during a period $t_{off}$, the Buck converter operating in a self-oscillatory mode during stable lamp operation, and
   a control circuit for generating the control signal and comprising a portion for generating a switch-on signal, a portion for generating a switch-off signal, and coupling means for applying the control signal to the portion for generating the switch-on signal, characterized in that the control circuit further comprises means for fixedly limiting the period $t_{off}$, and wherein the coupling means includes an OR gate.

9. The circuit arrangement as claimed in claim 6, wherein said coupling means further comprises an OR gate, an input of said OR gate being connected to an output of the AND gate.

10. The circuit arrangement as claimed in claim 2, wherein the fixed limits of the time period $t_{off}$ further comprises a maximum time period $t_{max}$.

11. The circuit arrangement as claimed in claim 3, wherein the control circuit includes switch-on circuitry for controlling generation of the switch-on signal portion, switch-off circuitry for controlling generation of the switch-off signal portion, and means for coupling the control signal to the switch-on circuitry.

12. The circuit arrangement as claimed in claim 5, characterized in that the coupling comprises an AND gate.

13. The circuit arrangement as claimed in claim 7, characterized in that the coupling comprises an OR gate.

14. The circuit arrangement as claimed in claim 8, characterized in that the coupling means further comprises an AND gate, an input of the OR gate being connected to an output of the AND gate.

15. The circuit arrangement as claimed in claim 1, wherein at least one limit of the period $t_{off}$ is fixed.

16. A circuit for igniting and operating a high-pressure discharge lamp, comprising:
- a Buck converter operative in a self-oscillatory mode during stable lamp operation and which includes switching-means, inductive means, and rectifying means for supplying the discharge lamp with a current through periodic switching of the switching means alternately into a conducting state during a time period $t_{on}$ and into a non-conducting state during a time period $t_{off}$,
- a control circuit for supplying the control signal to the switching means, wherein the control circuit includes first and second means for generating a switch-on signal and a switch-off signal, respectively, and third means for fixing maximum and minimum time limits for the time period $t_{off}$ wherein generation of the switch-on signal occurs after a time delayed response to the generation of the switch-off signal.

17. The circuit as claimed in claim 16, wherein, said means for fixing limits of the time period $t_{off}$ is operative only during ignition and run-up phases of the discharge lamp.

18. The circuit as claimed in claim 16, wherein, during stable lamp operation, the switching means are switched on via the control circuit in response to a signal derived from current flow through said inductive means.

19. The circuit as claimed in claim 16, further comprising means for coupling the control signal through the control circuit via said first signal generating means when the switching means are in the non-conducting state.

20. The circuit as claimed in claim 19, wherein said coupling means comprises first and second delay circuits defining minimum and maximum time limits $t_{min}$ and $t_{max}$, respectively, for the time period $t_{off}$.

21. The circuit arrangement as claimed in claim 1, wherein said means for providing fixed time limits is operative during ignition and run-up phases of the discharge lamp.

\* \* \* \* \*